(12) United States Patent
Koike et al.

(10) Patent No.: US 7,168,946 B2
(45) Date of Patent: Jan. 30, 2007

(54) MOVABLE-DIE SUPPORT DEVICE AND DIE CLAMPING UNIT

(75) Inventors: Jun Koike, Shizuoka-ken (JP); Takaki Miyauchi, Shizuoka-ken (JP); Noriyuki Sasaki, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 79 days.

(21) Appl. No.: 11/043,937

(22) Filed: Jan. 28, 2005

(65) Prior Publication Data

US 2005/0170038 A1 Aug. 4, 2005

(30) Foreign Application Priority Data

Jan. 30, 2004 (JP) ............................ 2004-023976
Jan. 19, 2005 (JP) ............................ 2005-011683

(51) Int. Cl.
*B29C 45/64* (2006.01)

(52) U.S. Cl. ................ 425/595; 425/451.9; 100/258 A
(58) Field of Classification Search ................ 425/595, 425/451.9, 470, 472; 100/258 A
See application file for complete search history.

(56) References Cited

U.S. PATENT DOCUMENTS 4,948,358 A * 8/1990 Kushibe et al. ......... 100/258 A
4,984,980 A * 1/1991 Ueno ....................... 425/595
5,249,951 A * 10/1993 Leonhartsberger et al. .................... 425/451.9
5,297,952 A * 3/1994 Leonhartsberger .......... 425/593
5,556,656 A * 9/1996 Lampl et al. ............ 425/451.9
6,599,117 B2 * 7/2003 Kasal et al. ................ 425/595
6,843,647 B2 * 1/2005 Fujita et al. ................ 425/589

FOREIGN PATENT DOCUMENTS

| EP | 764 509 | * 3/1997 |
|---|---|---|
| JP | 2-241715 | * 9/1990 |
| JP | 4-38936 | 9/1992 |
| JP | 2002-154146 | 5/2002 |
| JP | 2002-225101 | 8/2002 |
| JP | 2002-327826 | 11/2002 |
| JP | 2003-71894 | 3/2003 |
| JP | 2003-266503 | 9/2003 |
| JP | 2004-330449 | 11/2004 |

* cited by examiner

*Primary Examiner*—James P. Mackey
(74) *Attorney, Agent, or Firm*—DLA Piper US LLP (57) ABSTRACT

A support device for a movable die comprises a linear guide, a base, a movable platen, a driving mechanism which linearly moves the base, and a securing mechanism which secures the movable platen to the base. The base is guided by the linear guide and is linearly movable. A movable die is mounted to the movable platen, and the movable platen is mounted on the base. When the movable platen undergoes a deformation with a pressure of die clamping, the securing mechanism absorbs a displacement of the movable platen in a base movement direction or a vertical direction due to the deformation.

14 Claims, 9 Drawing Sheets

MOVABLE-DIE SUPPORT DEVICE AND DIE CLAMPING UNIT

CROSS-REFERENCE TO RELATED APPLICATIONS

This application is based upon and claims the benefit of priority from prior Japanese Patent Applications No. 2004-023976, filed Jan. 30, 2004; and No. 2005-011683, filed Jan. 19, 2005, the entire contents of both of which are incorporated herein by reference.

BACKGROUND OF THE INVENTION

1. Field of the Invention

The present invention relates to a support device for a support base that supports a movable die and to a die-clamping unit for use in, for example, an injection molding machine that forms molded products by injecting molten resin into injection-molding dies.

2. Description of the Related Art

Figure 19:
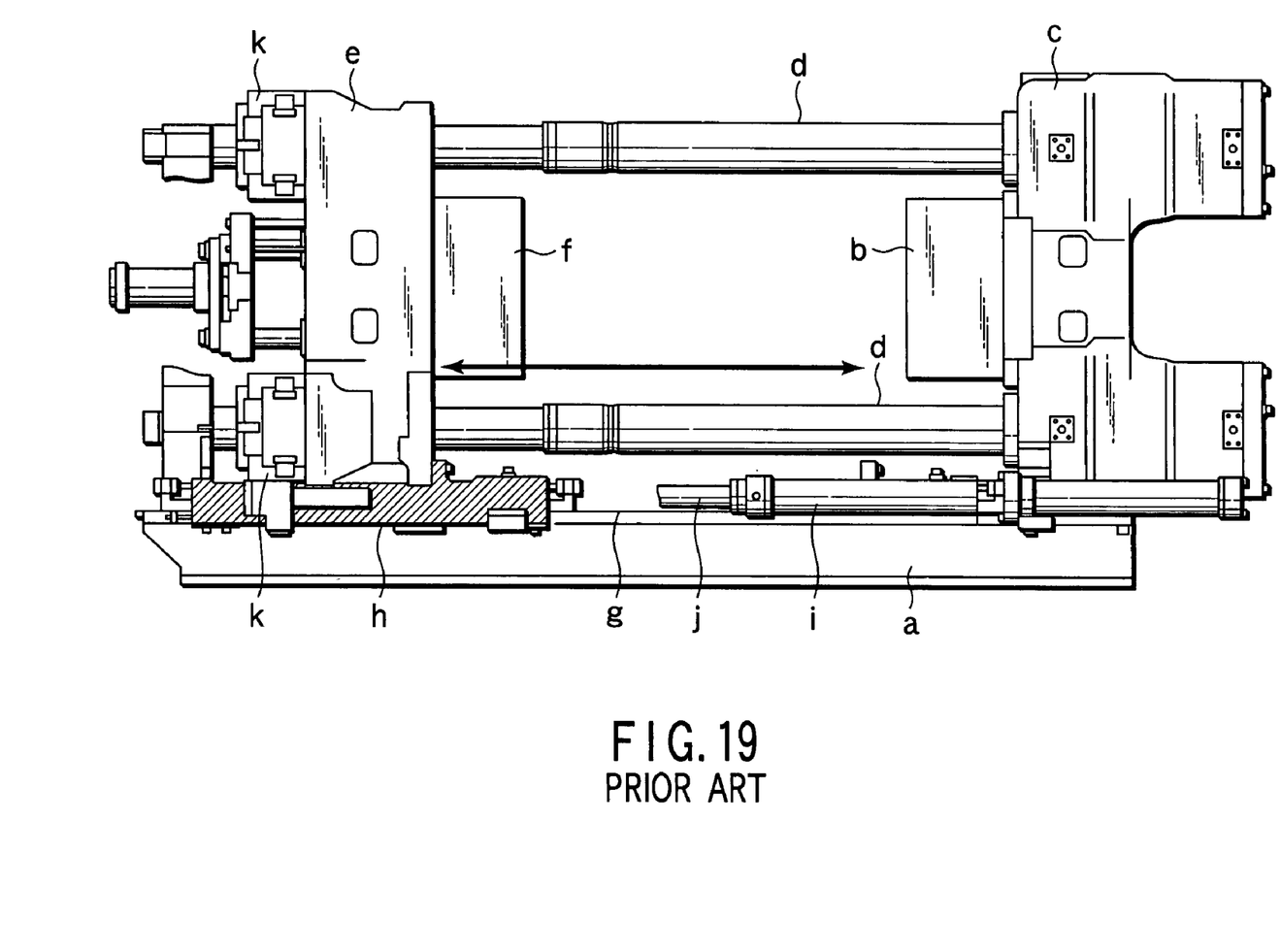
FIG. 19 is a side view of a conventional die-clamping unit of an injection molding machine.

FIG. 19 shows an example of a die-clamping unit for forming molded products by injecting molten resin into injection-molding dies. The die-clamping unit includes a frame a being used as a foundation. A stationary platen c having a stationary die b mounted thereto is provided to the frame a. In addition, the die-clamping unit has a movable platen e which can advance toward and recede from the stationary platen c through tie bars d. A movable die f is mounted to the movable platen e. The movable die f is capable of advancing toward and receding from the stationary die b.

A pair of left and right linear guides g are provided to the frame a. The movable platen e is supported to the linear guides g linearly movably through a movable-die support member h. Further, a pair of left and right die-opening/closing hydraulic cylinders i are disposed along the linear guides g, respectively. A rod j of the die-opening/closing hydraulic cylinders i is coupled to both right and left side portions of the movable platen e. In the event of die-closing operation, the movable platen e is moved by using the die-opening/closing hydraulic cylinders i to the side of the stationary platen c, and thereby, die surfaces of the stationary die b and the movable die f are joined together.

In addition, hydraulic die-clamping cylinders (not shown) are provided in an interior portion of the stationary platen c. A proximal end portion of the tie bar d has a piston portion (not shown). The piston portion is enclosed in the hydraulic die-clamping cylinder. Inner spacing of the hydraulic die-clamping cylinder is separated by the piston portion of the tie bar d into two chambers, namely, a die-clamping side chamber and a die-releasing side chamber.

Further, the injection molding machine includes half-nuts k on a back surface of the movable platen e. Each of the half-nuts k is engaged with an engagement portion of the tie bar d via opening/closing means (not shown). The movable platen e and the tie bar d are secured together through the engagement of the half-nut k with the tie bar d.

In a state where the movable platen e and the tie bar d are secured together, when a pressure oil is introduced into the die-clamping side chamber of the hydraulic die-clamping cylinder, the stationary die b and the movable die f are "die-clamped" ("clamped," hereafter) with respect to each other via the tie bar d.

The movable-die support member h is mounted linearly movably along the linear guides g. The movable-die support member h has a longitudinal direction in a die-opening/closing direction of the movable platen e. Accordingly, with the moment against the tilt of the movable platen e being received, die-opening/closing operation can be performed with parallelism being maintained.

In the die-clamping event, however, when the movable die f and the stationary die b are clamped by a large force being exerted by the hydraulic die-clamping cylinder (not shown) on the movable platen e, an outer peripheral edge of the movable platen e is deformed toward the side of the stationary platen c. In addition, an outer peripheral edge of the stationary platen c is deformed toward the side of the movable platen e.

More specifically, either in a side view or plan view, the stationary platen c and the movable platen e are individually deformed substantially into circularly arcuate shapes. Consequently, a problem arises in that the sliding resistance between the linear guides g and the movable-die support member h is increased.

Particularly, a growing demand is made for reduction of the sliding resistance in the event of employing a hybrid injection molding machine that drives a movable platen in accordance with a combination of a servomotor and ball screws. Therefore, conventionally, various attempts have been made for the development of technical devices.

For example, Jpn. Pat. Appln. KOKAI Publications No. 2002-154146 and No. 2002-225101 each disclose a die-clamping unit incorporating technical devices made to reduce the sliding resistance between a linear guide and a movable-die support member.

A hybrid injection molding machine described in each of Jpn. Pat. Appln. KOKAI Publications No. 2002-154146 and No. 2002-225101 includes a disc spring in a mounting portion of a nut portion of a ball screw and a movable die plate (corresponding to the movable platen described in the present invention). Accordingly, the disc spring is deflected even when the mounting portion of movable die plate is tilted, so that a bending force can be prevented from acting on screw portion of the ball screw through the nut portion.

In addition, Jpn. Pat. Appln. KOKAI Publication No. 2002-327826 discloses a die-clamping unit wherein a nut portion of a ball screw is supported by a bracket having a spherical body. In the die-clamping unit, even when a mounting portion of a movable die plate (corresponding to the movable platen described in the present invention) is tilted, the spherical body is rotated. Thereby, a bending force can be prevented from acting on the screw portion of the ball screw through the nut portion.

In addition, Jpn. Pat. Appln. KOKAI Publication No. 2003-071894 and Jpn. UM Appln. KOKOKU Publication No. 4-38936 each discloses a die-clamping unit including an elastic member provided between a movable platen and a support member to absorb a load acting on the support member. In the die-clamping unit, a component such as a coil spring or a disc spring is used for the elastic member provided for load absorption. The provision of the elastic member enables the load absorption without regulating the deformation of the movable platen.

In addition, Jpn. Pat. Appln. KOKAI Publication No. 2003-266503 discloses a die-clamping unit including a platen support member that slides along linear guides. A movable platen and the platen support member are rotatably intercoupled through a coupling member. Accordingly, in the die-clamping unit, even when a deformation has occurred in the movable platen, the deformation is not transmitted to the linear guides.

Further, Jpn. Pat. Appln. KOKAI Publication No. 2004-330449 discloses a unit including a deformation absorbing mechanism that absorbs deformation of the movable platen between a movable platen and linear guides. Thereby, even when a deformation has occurred in the movable platen, the deformation is not transmitted to the linear guides.

However, in each of the units disclosed in Jpn. Pat. Appln. KOKAI Publications No. 2002-154146, No. 2002-225101, and No. 2002-327826, the structure of the ball screw is very complex. In each of the units disclosed in Jpn. Pat. Appln. KOKAI Publication No. 2003-071894 and Jpn. UM Appln. KOKOKU Publication No. 04-38936, while a deformation of the movable platen in a front-rear direction can be absorbed, a deformation of the movable platen in a left-right direction cannot be absorbed.

BRIEF SUMMARY OF THE INVENTION

The present invention is to provide a support device for a movable die and a die-clamping unit that, even when a movable platen undergoes a deformation either in a front-rear direction or left-right direction, absorbs the deformation, therefore not influencing components, such as a linear guide, movable platen, and die.

A support device for a movable die according to the present invention comprises a linear guide, a base, a driving mechanism, a movable platen, and a securing mechanism. The base is guided by the linear guide and is linearly movable. The base is linearly moved by the driving mechanism. The movable platen is mounted on the base. The movable platen is configured to hold the movable die. The securing mechanism secures the movable platen to the base. When the movable platen undergoes a deformation with a pressure of die clamping, the securing mechanism absorbs the displacement of the movable platen in a base movement direction or a vertical direction due to the deformation. Here the vertical direction means the direction of gravitational force.

According to the configuration described above, when the movable platen undergoes a deformation in either the left-right direction or front-rear direction, the deformation can be absorbed by the securing mechanism. Thereby, influences of the deformation on the movable platen, stationary die, movable die, and linear guide can be reduced. Consequently, the service life of the die-clamping unit can be increased.

According to one preferred mode of the present invention, the securing mechanism comprises a first securing mechanism and a second securing mechanism. The first securing mechanism secures both right and left side portions of the movable platen to the base, and absorbs the displacement of the movable platen in the vertical direction. The second securing mechanism secures both right and left side portions of the movable platen to the base, and absorbs the displacement of the movable platen in the base movement direction.

According to another preferred mode of the present invention, the first securing mechanism and the second securing mechanism are elastic mechanisms, more specifically, disc springs or coil springs that respectively undergo a elastic deformation in association with the displacement of the movable platen and thereby absorb the displacement of the movable platen. According to another preferred mode of the invention, the first securing mechanism and the second securing mechanism are absorbing mechanisms, more specifically, hydraulic cylinders or pneumatic cylinders that respectively undergo a displacement in association with the displacement of the movable platen and thereby absorb the displacement of the movable platen.

According to another preferred mode of the invention, the support device further comprises a movable-die support member. The movable-die support member is provided integrally or separately in a lower end portion of the movable platen, and is mounted between the movable platen and the base. The securing mechanism is disposed in a position higher than a center line of any one of a front face and a rear face of the movable-die support member. The securing mech-anism absorbs displacements of the movable platen in the vertical direction and in the base movement direction.

In addition, a die-clamping unit according to the invention comprises a stationary platen, a movable platen, a die-clamping mechanism, a linear guide, a base, a driving mechanism, and a securing mechanism. The stationary platen is configured to hold a stationary die. The movable platen is configured to hold a movable die. The movable platen can advance toward and recede from the stationary platen. The die-clamping mechanism presses the movable platen against the stationary platen, and thereby "die-clamps" ("clamps," hereafter) the stationary die and the movable die together. The movable platen is mounted on the base. The base is linearly movably guided by the linear guide. The base is linearly moved by the driving mechanism. The securing mechanism secures the movable platen to the base. When the movable platen undergoes a deformation with a pressure of die clamping, the securing mechanism absorbs a displacement of the movable platen in a base movement direction or a vertical direction due to the deformation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
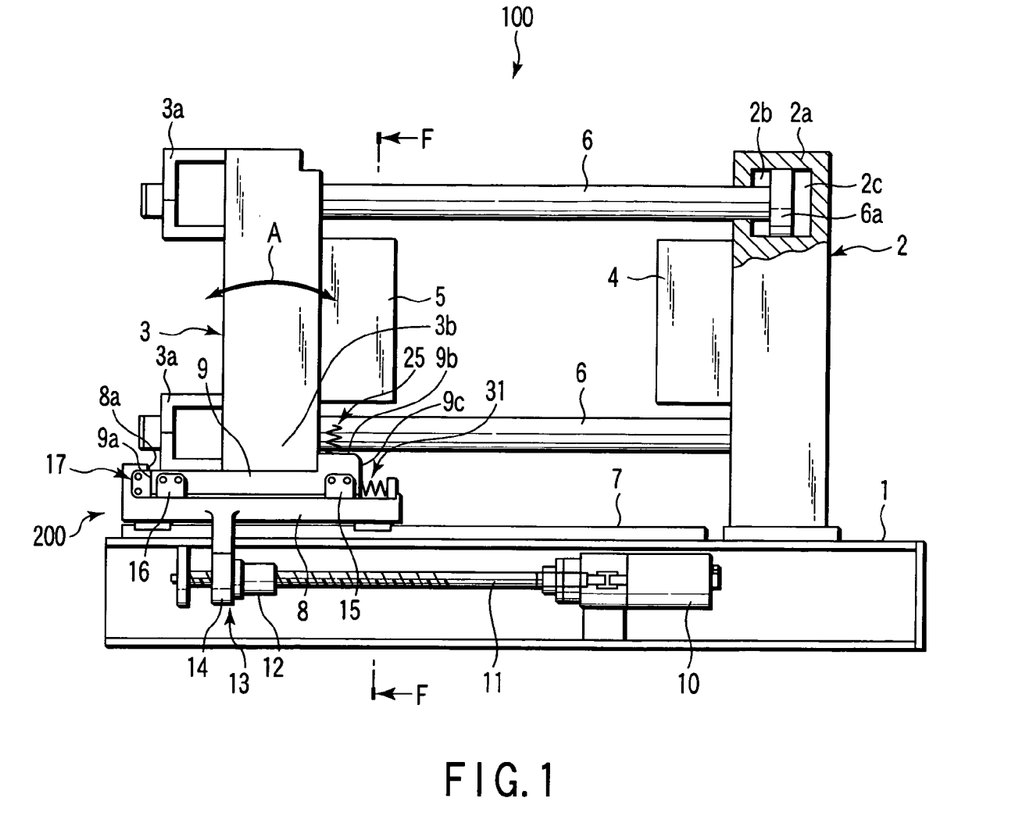
FIG. 1 is a side view of a die-clamping unit of an injection molding machine according to a first embodiment of the present invention.
Figure 2:
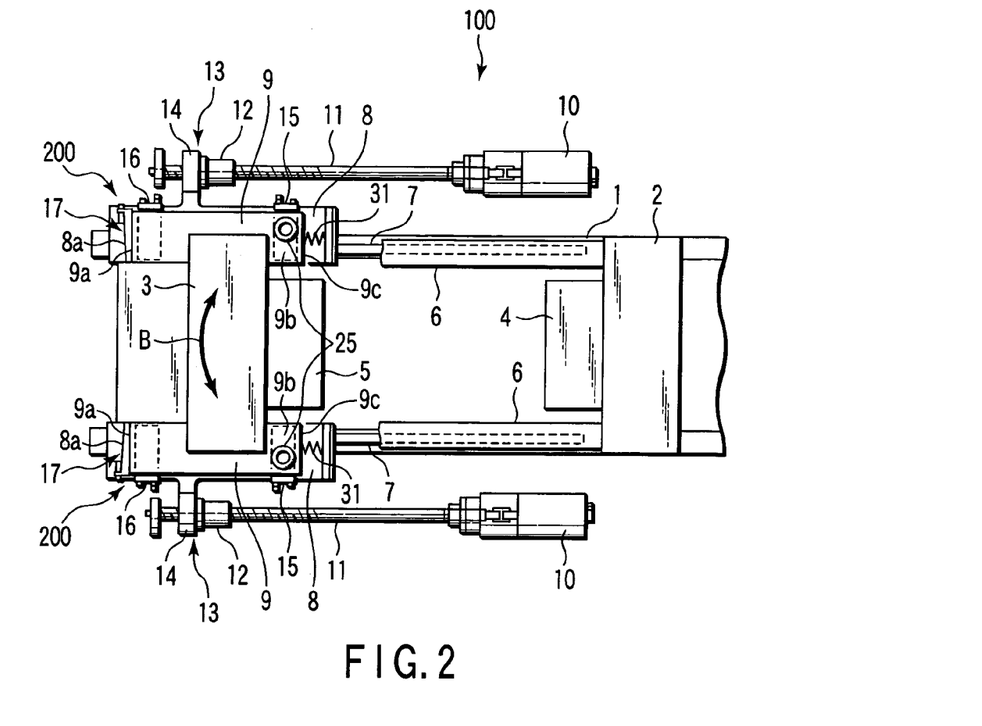
FIG. 2 is a plan view of the die-clamping unit shown in FIG. 1.
Figure 3:
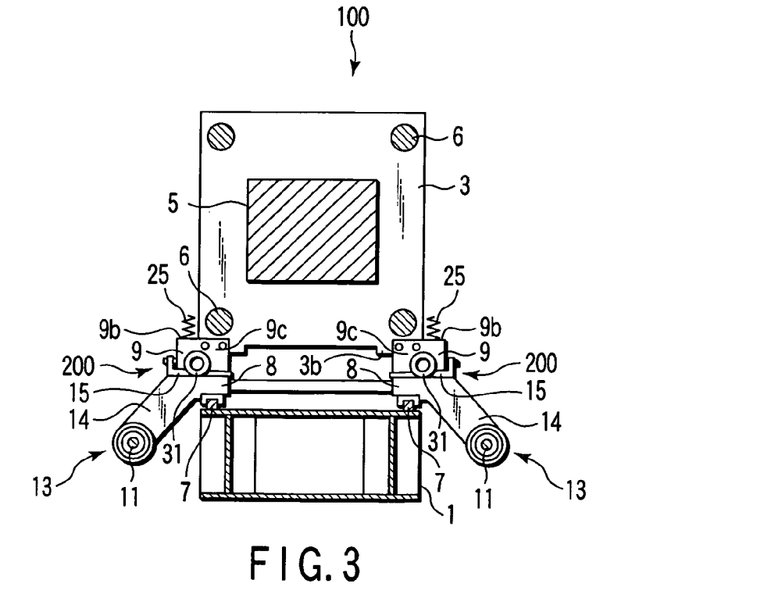
FIG. 3 is a cross section of the die-clamping unit taken along the F—F line of FIG. 1.

A die-clamping unit 100 according to a first embodiment of the present invention will be described herebelow with reference to FIGS. 1 to 9. FIG. 1 is a side view of the die-clamping unit 100 of a hybrid injection molding machine. FIG. 2 a plan view of the die-clamping unit 100, and FIG. 3 is a cross section thereof taken along the F—F line of FIG. 1.

As shown in FIGS. 1 and 2, the die-clamping unit 100 of the first embodiment includes a frame 1 serving as a foundation for the die-clamping unit 100, a stationary platen 2, and a movable platen 3. The stationary platen 2 is secured to the frame 1. A stationary die 4 is mounted to the stationary platen 2. A movable die 5 opposing the stationary die 4 is mounted to the movable platen 3. A plurality of tie bars 6 are protrudingly provided to the stationary platen 2. The movable platen 3 is extendable and retractable in the direction of moving along the tie bars 6 toward or away from the stationary platen 2.

The die-clamping unit 100 further has a support device 200 that supports the movable platen 3. The support device 200 has component members, such as linear guides 7, bases 8, and movable-die support members 9.

The linear guides 7 are provided in left and right portions in a pair on the frame 1. The bases 8 are provided in left and right portions in a pair, and are supported to the linear guides 7 to be linearly movable along the extension and retraction directions of the movable platen 3. The movable-die support member 9 formed separately from the base 8 is secured to the base 8. The movable platen 3 is secured to the respective movable-die support members 9. Accordingly, the bases 8, the movable platen 3, and the movable-die support members 9 are individually guided by the linear guides 7 or the tie bars 6, and are integrally linearly moved.

Servomotors 10 are individually supported in support mechanisms (not shown), and are disposed in left and right portions of the frame 1. A screw portion 11 is provided to a rotation axis of each of the servomotors 10 in parallel to the linear guide 7. Nut portions 12 each are screw-engaged with the screw portion 11, and ball screws 13 are thereby constructed. The nut portion 12 is secured to each of mounting portions 14 outwardly protruding from the respectively bases 8. The mounting portion 14 is provided integrally with the base 8.

Accordingly, the rotatory motion (rotation in other words) of the servomotor 10 is converted into a linear motion by the ball screw 13. With the linear motion, the base 8 is guided by the linear guide 7, and is thereby linearly moved. More specifically, upon rotation of the servomotors 10, the movable platen 3 and movable-die support members 9 mounted on the bases 8 are guided by the tie bars 6, and are integrally linearly moved.

Hydraulic die-clamping cylinders 2a are provided in an interior portion of the stationary platen 2. A proximal end portion of the tie bars 6 has a piston portion 6a. The piston portion 6a is enclosed in the hydraulic die-clamping cylinders 2a. Spacing in the hydraulic die-clamping cylinder 2a is separated by the piston portion 6a of the tie bar 6 into two chambers, namely, a die-clamping side chamber 2b and a die-opening side chamber 2c. The die-clamping side chamber 2b is provided on a side where the volume increases in the event of die clamping. The die-opening side chamber 2c is provided on a side where the volume decreases in the event of die clamping.

The die-clamping unit 100 has half nuts 3a on a back surface of the movable platen 3. The half-nut 3a is engaged with an engagement groove of the tie bar 6 through opening/closing means (not shown). With the engagement between the half nuts 3a and the tie bars 6, the movable platen 3 and the tie bars 6 are secured together.

In a state where the movable platen 3 and the tie bars 6 are secured together, when a pressure oil is introduced into the die-clamping side chambers 2b of the respective hydraulic die-clamping cylinders 2a, the movable platen 3 is pressed against the stationary platen 2 through the tie bars 6. Thereby, the stationary die 4 and the movable die 5 are clamped together.

First wedges 15 and second wedges 16 are provided between the bases 8 and the movable-die support members 9. The first wedge 15 and the second wedge 16 each are an adjustment mechanism that adjusts a tilt of the movable-die support member 9 in a front-rear direction A with respect to the base 8 (tilt in the direction of horizontal axial rotation, with the movement direction of the movable platen 3 being set to the normal direction; or, tilt in the direction of vertical axial rotation with respect to the drawing paper surface in FIG. 1). The first wedge 15 and the second wedge 16 are separately disposed in front and rear portions of a centroidal position of members to be mounted on the base 8.

The base 8 has one-step higher upstanding portions individually formed in its front end portion and rear end portion. The upstanding portion in the rear end portion has a vertical face 8a on the side of a movable-platen forward direction (right side in the FIG. 1). A third wedge 17 is provided between the vertical face 8a and a rear face (left side face in FIG. 1) 9a of the movable-die support member 9. The third wedge 17 is an adjustment mechanism that adjusts a tilt of the movable-die support member 9 in the left-right direction with respect to the base 8 (tilt in the direction of vertical axial rotation; or, tilt in the direction of vertical axial rotation with respect to the drawing paper surface in FIG. 2).

Figure 4:
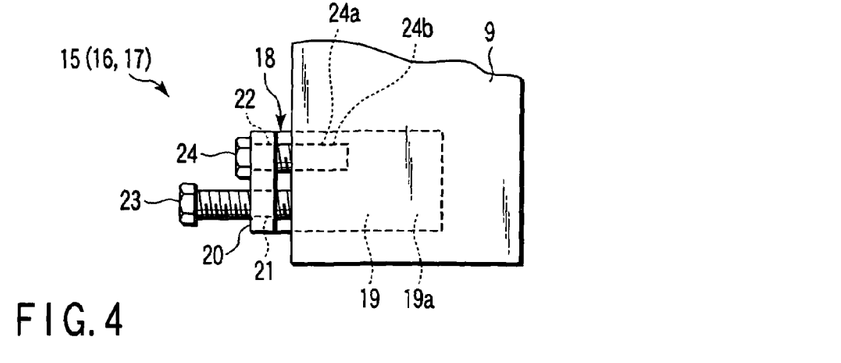
FIG. 4 is a plan view showing a wedge mechanism assembled into the die-clamping unit and parts of the die-clamping unit shown in FIG. 1.
Figures 5, 6:
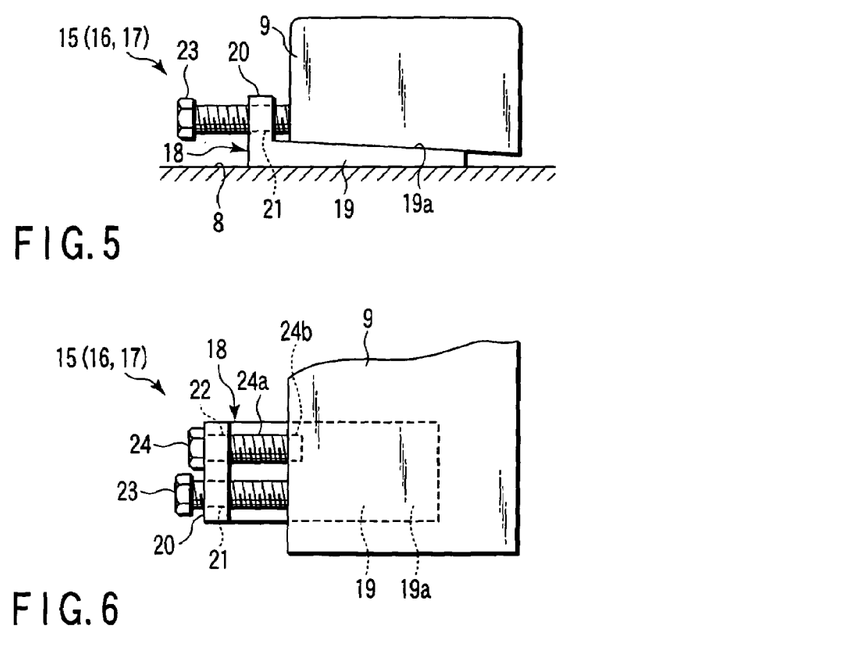
FIG. 5 is a side view showing the wedge mechanism and parts of die-clamping unit shown in FIG. 4.
FIG. 6 is a plan view showing a state where a wedge body of the wedge mechanism shown in FIG. 4 is retracted with respect to a movable-die support member.

Basic structures of the first to third wedges 15 to 17 are the same, and are each constructed as shown in FIGS. 4 and 5. More specifically, a wedge body 18 includes an insert portion 19 having a sloped face 19a. An upstanding portion 20 is integrally provided in a proximal end portion of the insert portion 19. First and second threaded holes 21 and 22 are formed in the upstanding portion 20. A first bolt 23 is engaged with the first threaded hole 21, and a distal end portion thereof is abutted with a sidewall of the movable-die support member 9. A second bolt 24 is engaged with the second threaded hole 22, wherein a screw portion 24a thereof is engaged with a threaded hole 24b provided to the sidewall of the movable-die support member 9.

Figure 7:
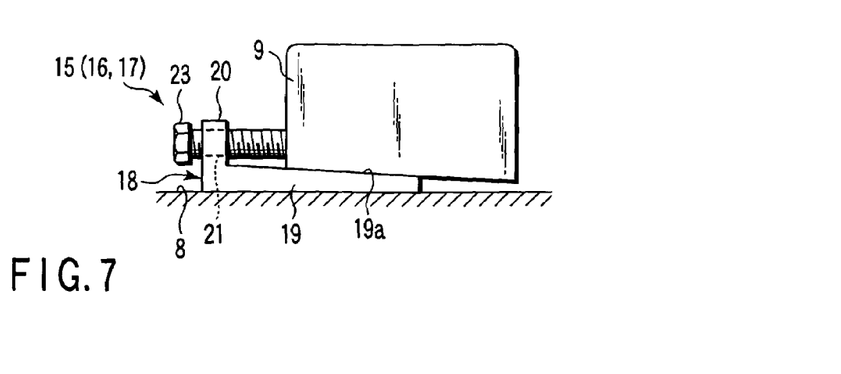
FIG. 7 is a side view showing a state where the wedge body of the wedge mechanism shown in FIG. 4 is retracted with respect to the movable-die support member.

Therefore, as shown in FIGS. 4 and 5, when the first bolt 23 is loosened and the second bolt 24 is screwed, the wedge body 18 extends with respect to the movable-die support member 9. Conversely, as shown in FIGS. 6 to 7, the wedge body 18 retracts with respect to the movable-die support member 9 when the second bolt 24 is loosened and the first bolt 23 is screwed.

As shown in FIGS. 1 to 3, the first wedge 15 is provided between the left/right base 8 and the movable-die support member 9 on the front side of the movable platen 3. The second wedge 16 is provided between the left/right base 8 and movable-die support member 9 at the rear end side of the movable platen 3. Therefore, with the first wedges 15 and 16, the tilt of the movable-die support member 9 in the front-rear direction A with respect to the base 8 can be adjusted.

The third wedge 17 is provided between the upstanding portion on the rear end side of the left/right base 8 and the movable-die support member 9. More specifically, the third wedge 17 is provided between the vertical face 8a of the base 8 and the rear face 9a of the movable-die support member 9 so as to be perpendicular to the first and second wedges 15 and 16. Therefore, with the third wedge 17, a tilt of the movable-die support member 9 in a left-right direction B with respect to the base 8 can be adjusted.

Figure 8:
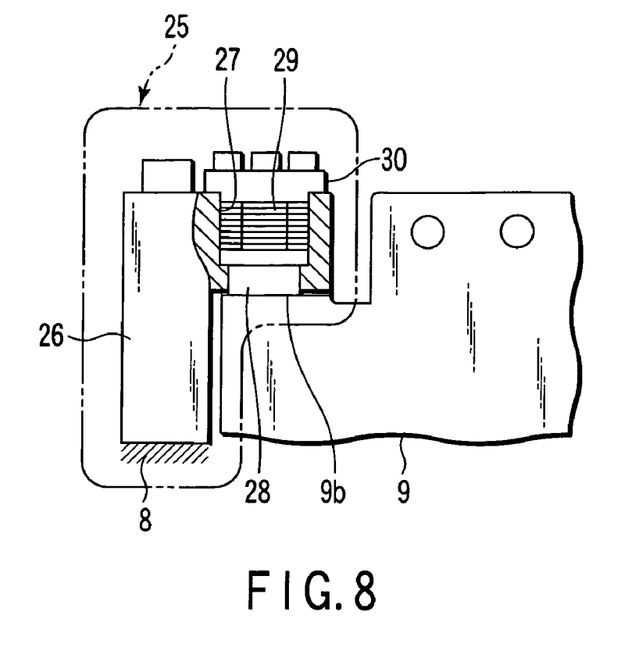
FIG. 8 is a side view showing a first elastic mechanism, which is assembled into the die-clamping unit and parts of the die-clamping unit shown in FIG. 1.

A first elastic mechanism 25 is provided to an upper face 9b of the movable-die support member 9 that opposes the first wedge 15. The first elastic mechanism 25 elastically presses the movable-die support member 9 along the direction of the base 8 (vertical direction, or downward direction in FIG. 1). The first elastic mechanism 25 functions as the first securing mechanism that secures the movable platen 3 to the bases 8. More specifically, as shown in FIG. 8, a spring holder 26 is fixed to the base 8. A spring-housing portion 27 formed of recessed portion is provided to the spring holder 26 in the vertical direction so as to oppose the upper face 9b of the movable-die support member 9. A pressing piston 28 and a plurality of disc springs 29 are housed in the spring-housing portion 27. The disc springs 29 are retained in a state of being pressed by a lid unit 30 that closes the spring-housing portion 27. Consequently, the pressing piston 28 is elastically pressed by elastic force of the disc spring 29 onto the upper face 9b of the movable-die support member 9. That is, the pair of left and right movable-die support members 9 are pressed by the disc spring 29 along the vertical direction with respect to the pair of left and right bases 8.

Figure 9:
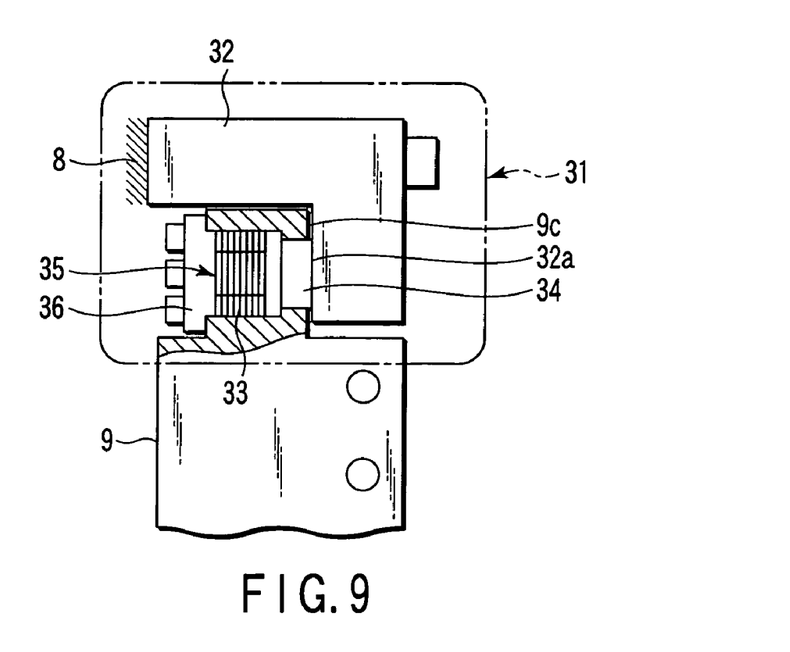
FIG. 9 is a side view showing a second elastic mechanism, which is assembled into the die-clamping unit and parts of the die-clamping unit shown in FIG. 1.

A second elastic mechanism 31 is provided in a front portion of the base 8. The second elastic mechanism 31 elastically presses the movable-die support member 9 along a retraction direction (left direction in FIG. 1) of the movable platen 3 so as to oppose the third wedge 17. The second elastic mechanism 31 functions as the second securing mechanism that secures the movable platen 3 to the bases 8. More specifically, as shown in FIG. 9, an L-shaped abutting plate 32 is provided to the base 8. A vertical face 32a opposing a front face 9c of the movable-die support member 9 is provided to the abutting plate 32.

In the movable-die support member 9, a spring-housing portion 33 formed of a recessed portion is provided in the front-rear direction (left-right direction in FIG. 1). A pressing piston 34 and a plurality of disc springs 35 are housed in the spring-housing portion 33. The disc springs 35 are retained in a state of being pressed by a lid unit 36 that closes the spring-housing portion 33. Consequently, the pressing piston 34 is elastically pressed by elastic force of the disc springs 35 onto the vertical face 32a of the abutting plate 32. That is, the pair of left and right movable-die support members 9 are pressed by the disc springs 35 along the front-rear direction with respect to the pair of left and right bases 8.

The first and second elastic mechanisms 25 and 31 for absorbing a deformation occurring in the movable platen 3 are thus provided between the base 8 and the movable-die support member 9. Thereby, deformations of the movable platen 3 in the front-rear direction A and the left-right direction B are absorbed. More specifically, while the movable platen 3 is linearly movable by the linear guides 7, the movable platen 3 is elastically supported by the first and second elastic mechanisms 25 and 31 in the front-rear direction and left-right direction in the vicinity of the linear guides 7 of the movable platen 3. When deformation is caused in the movable platen 3, the deformation is absorbed, thereby to reduce influences to the movable platen 3, the stationary and movable dies 4 and 5, and the linear guides 7.

Operation of the die-clamping unit 100 of the injection molding machine will now be described herebelow.

First, with the first and second wedges 15 and 16, the tilt of the movable-die support member 9 in the front-rear direction A with respect to the base 8 can be adjusted. In this case, when the first bolt 23 is loosened and the second bolt 24 is screwed, the wedge body 18 extends with respect to the movable-die support member 9. Conversely, when the second bolt 24 is loosened and the first bolt 23 is screwed, the wedge body 18 retracts with respect to the movable-die support member 9. Thereby, with the first and second wedges 15 and 16, the movable platen 3 can be adjusted to be vertical with respect to the frame 1. The third wedge 17 functions similar to the above. That is, by loosening or tightening the first and second bolts 23 and 24 of the third wedge 17, the tilt of the movable-die support member 9 in the left-right direction B with respect to the base 8 can be adjusted. Accordingly, the movable platen 3 can be adjusted to be perpendicular with respect to the linear guide 7.

Subsequently, in the event of die closing of the stationary die 4, which is mounted to the stationary platen 2, and the movable die 5, which is mounted to the movable platen 3, with respect to each other, the left and right servomotors 10 are driven at the same time. The rotation of the servomotor 10 is converted by the ball screw 13 to a linear motion, whereby the base 8 is guided by the linear guide 7 thereby to linearly move. As a result, the movable platen 3 mounted to base 8 and the movable-die support member 9 are guided by the tie bar 6, thereby to integrally linearly move. Then, the stationary die 4 and the movable die 5 are "die-closed" ("closed," hereafter) together.

Next, die clamping is performed. In a state where the stationary die 4 and the movable die 5 are closed together, the half nut 3a is tightened by using opening/closing means (not shown). More specifically, the half nut 3a is engaged with the engagement groove of the tie bar 6. In this manner, the movable platen 3 and the tie bar 6 are secured together. Then, the pressure oil is introduced into the die-clamping side chamber 2b of the hydraulic die-clamping cylinder 2a. Consequently, the tie bar 6 is drawn to the side of the stationary platen 2, thereby to accomplish die clamping of the stationary die 4 and the movable die 5 with respect to each other.

After the stationary die 4 and the movable die 5 have been clamped together, a predetermined amount of molten resin is injected from an injection nozzle(s) of an injection molding machine (not shown). The molten resin is thereby filled into a cavity (not shown) formed between the stationary die 4 and the movable die 5. The molten resin is an example of material. Upon completion of filling of the molten resin, the operation enters an injection pressing step by use of well-known means. In the injection pressing step, a high pressure die-clamping force is generated, thereby to press the molten resin inside the cavity. Thereafter, dwelling and cooling steps are carried out, and a molded product is then formed.

In the above, when the high-pressure die-clamping force is generated by using the hydraulic die-clamping cylinder 2a, such a case can occur in which the movable platen 3 is tilted in the front-rear direction A or left-right direction B. In addition, an outer peripheral edge of the movable platen 3 is deformed to the side of the stationary platen 2. In other words, the movable platen 3 is substantially arcuately deformed either in a side view or plan view.

In this case, the tilt of the movable platen 3 in the front-rear direction A is absorbed by a elastic deformation of the first elastic mechanism 25. The tilt of the movable platen 3 in the left-right direction B is absorbed by a elastic deformation of the second elastic mechanism 31. Accordingly, while the movable-die support member 9 is tilted in the vertical and/or left-right direction, since the movable-die support member 9 is an independent member with respect to the base 8, the load is not imposed on the base 8. That is, even when the movable-die support member 9 is tilted along the vertical and/or left-right direction, the load is not imposed on the movably supported base 8. Consequently, the respective bases 8 are enabled to smoothly slide with respect to the linear guides 7.

In addition, when a deformation is caused in the movable platen 3, the first and second elastic mechanisms 25 and 31 undergo elastic deformations, thereby to absorb the deformation of the movable platen 3. Consequently, even when the movable platen 3 is deformed, the influence to the stationary and movable dies 4 and 5 and the linear guides 7 can be reduced.

According to the above, the linear guides 7 and the bases 8 can be protected, thereby the device service life can be increased.

Figure 10:
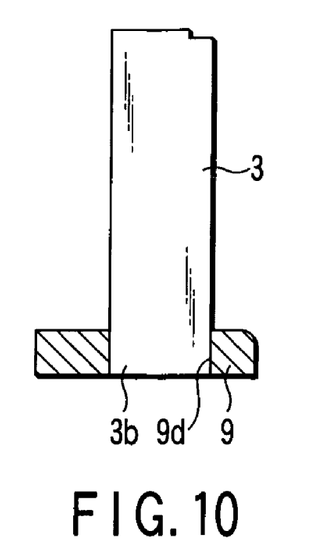
FIG. 10 is a view showing modified examples of the movable platen and movable-die support member assembled into the die-clamping unit shown in FIG. 1.
Figure 11:
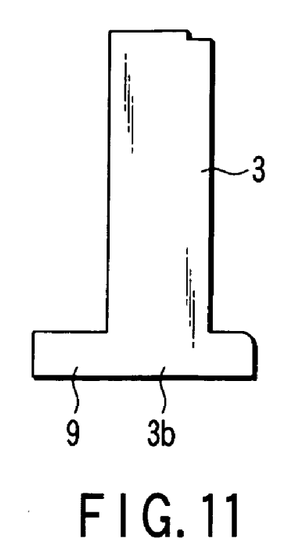
FIG. 11 is a view showing other modified examples of the movable platen and movable-die support member assembled into the die-clamping unit shown in FIG. 1.

As described above, in the first embodiment, the movable platen 3 is secured to the upper faces of the respective movable-die support members 9. However, as shown in FIG. 10, a securing hole 9d may be provided in the movable-die support member 9, and the movable platen 3 may be engageably secured to the securing hole 9d. Alternatively, as shown in FIG. 11, a lower end portion 3b of the movable platen 3 and the movable-die support member 9 may be integrally constructed. That is, the movable-die support member 9 may be a part of the movable platen 3.

Whereas the disc springs 29 and 35 are, respectively, provided in the first and second elastic mechanisms 25 and 31, the type of the springs is not limited by the structure of the elastic mechanism, so that the springs may be coil springs. In addition, the second elastic mechanism 31 and the third wedge 17 may be disposed in the reversed front and rear positions.

(Second Embodiment)

A second embodiment of the present invention will be described herebelow with reference to FIG. 12. The same reference characters are used to designate the same portions of the construction as those of the die-clamping device 100 of the first embodiment, and descriptions thereof are omitted herefrom.

According to the first embodiment, there are provided the first elastic mechanism 25, which press the movable-die support members 9 from the upper portion onto the bases 8, and the second elastic mechanism 31, which press the movable-die support member 9 from the front side to rear side of the movable-die support members 9.

Figure 12:
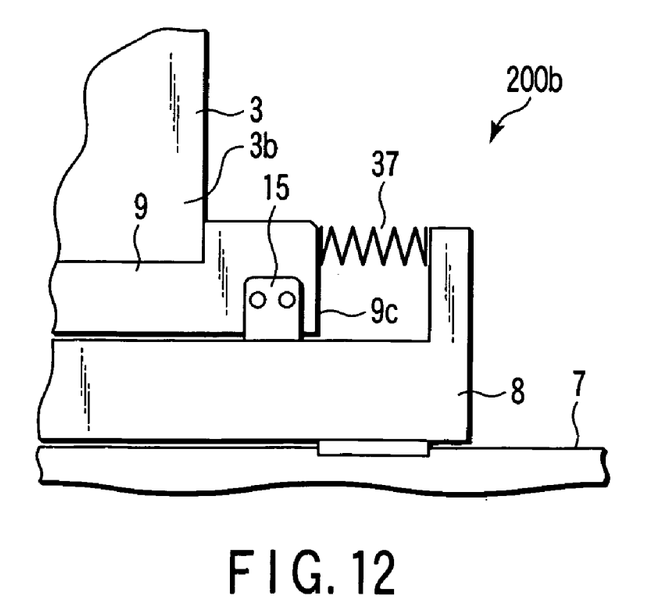
FIG. 12 is a side view showing an arrangement structure of a elastic mechanism assembled into a die-clamping unit of an injection molding machine according to a second embodiment of the present invention.

In each movable-die support device 200b according to the present embodiment, however, as shown in FIG. 12, a elastic mechanism 37 is provided to the front face 9c (right side face in FIG. 12) of the movable-die support member 9. More specifically, the elastic mechanism 37 is provided in a position higher than the center line of the front face 9c of the movable-die support member 9 (position spaced away from the base 8 with respect to the center line) such as to press the movable-die support member 9 in the retraction direction (left direction in FIG. 12) of the movable platen 3. The configuration of the elastic mechanism 37 is the same as that of the second elastic mechanism 31 according to the first embodiment. When the movable-die support member 9 is thus pressed by the elastic mechanism 37 in the horizontal direction, the rotation moment in the front-rear direction is generated to act on the movable platen 3, thereby enabling the movable-die support member 9 to be pressed in the vertical direction. Namely, the first elastic mechanism 25 can be omitted. Meanwhile, similarly as in the first embodiment, the elastic mechanism 37 and the third wedge 17 may be disposed in the reversed front and rear positions.

(Third Embodiment)

Figure 13:
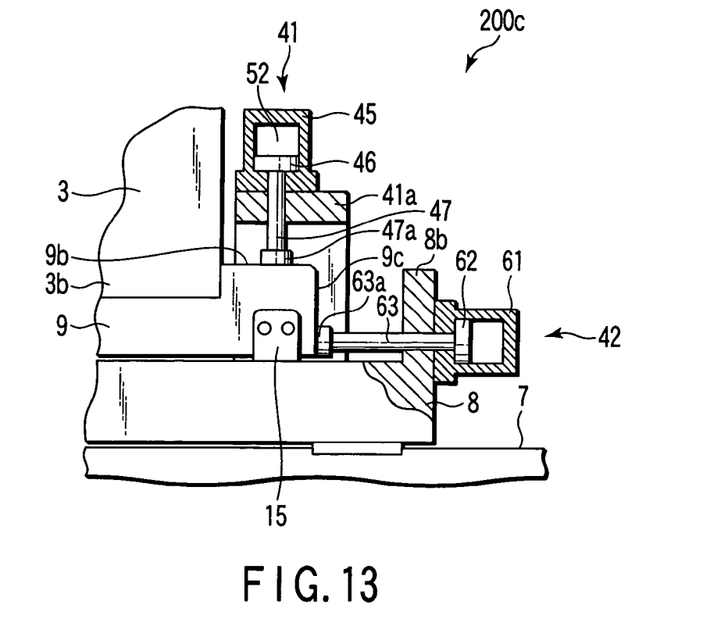
FIG. 13 is a partial cross section view showing an arrangement structure of a absorbing mechanism assembled into a die-clamping unit of an injection molding machine according to a third embodiment of the present invention.

A third embodiment of the present invention will be described herebelow with reference to FIGS. 13, 15, and 16. The same reference characters are used to designate the same portions of the construction as those of the die-clamping device 100 of the first embodiment, and descriptions thereof are omitted herefrom. A movable-die support device 200c of the third embodiment includes a first absorbing mechanism 41 and a second absorbing mechanism 42 that replace the first elastic mechanism 25 and second elastic mechanism 31, respectively, of the first embodiment.

Similarly as in the first embodiment, the first wedge 15 is provided in the movable-die support device 200c of the third embodiment. The first absorbing mechanism 41 is provided on the upper face 9b of the movable-die support member 9 opposing the first wedge 15. The first absorbing mechanism 41 functions as the first securing mechanism that secures the movable platen 3 to the base 8. The first absorbing mechanism 41 has, for example, a hydraulic cylinder.

More specifically, the first absorbing mechanism 41 has a hydraulic cylinder 45 and a piston 46. The hydraulic cylinder 45 is mounted to a mounting member 41a. The mounting member 41a is mounted to the base 8. Thus, the hydraulic cylinder 45 is secured to the base 8. On an outer surface of the mounting member 41a, the hydraulic cylinder 45 is disposed in a position opposing the upper face 9b of the movable-die support member 9. The piston 46 is enclosed in the hydraulic cylinder 45, and is extendable and retractable therein. A proximal end portion of a rod 47 is mounted to the piston 46. A distal end portion 47a of the rod 47 extends through the hydraulic cylinder 45 and the mounting member 41a, and abuts the upper face 9b of the movable-die support member 9.

Figure 15:
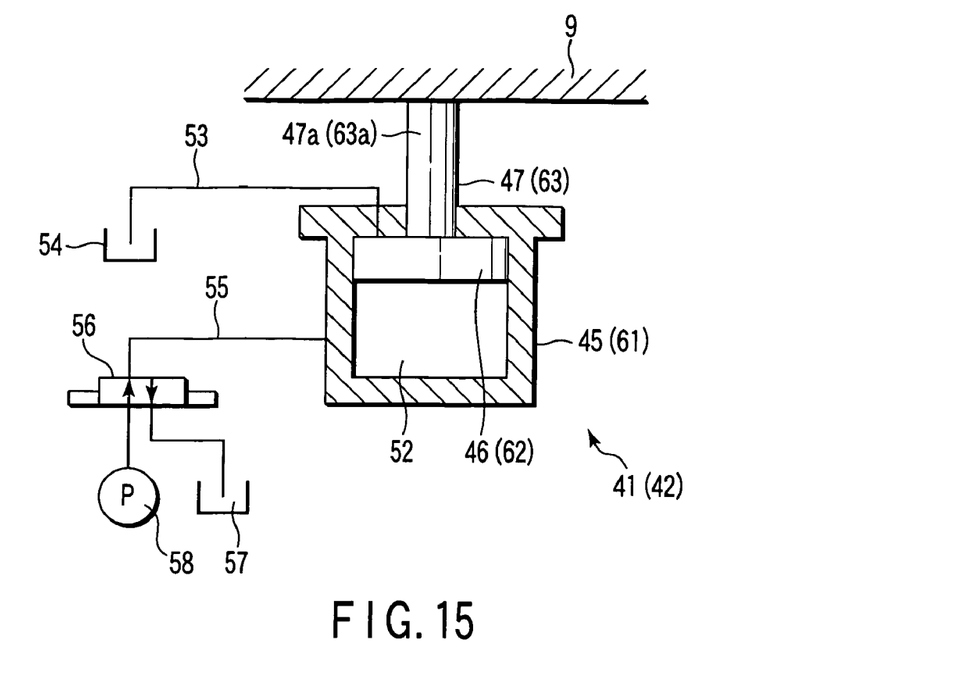
FIG. 15 is a cross section showing a construction of a absorbing mechanism assembled into the die-clamping device shown in FIG. 13.
Figure 16:
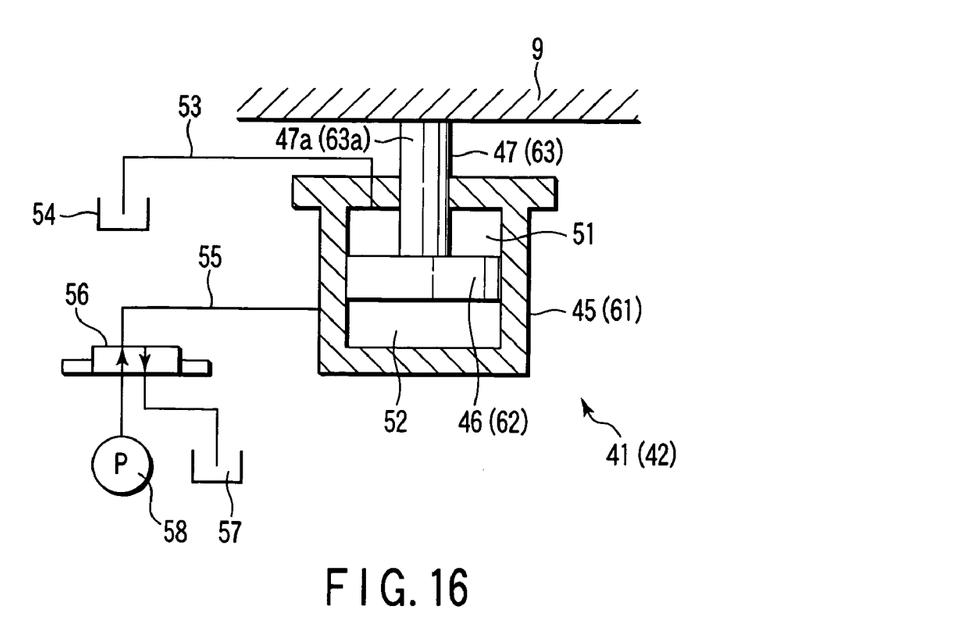
FIG. 16 is a cross section showing the absorbing mechanism shown in FIG. 15 in a state where a pressure due to a deformation of the movable platen is applied to the absorbing mechanism.

FIGS. 15 and 16 are schematic views of the configuration of the hydraulic cylinder 45. As shown in the drawing figures, an interior portion of the hydraulic cylinder 45 is formed with the piston 46 into a front chamber (cylinder chamber on the side of the rod) 51 and a rear chamber (cylinder chamber on the side of a head) 52.

The front chamber 51 is coupled to a first tank 54 through piping 53. The rear chamber 52 is coupled to a selector valve 56 through piping 55. The selector valve 56 is coupled to a second tank 57 and a hydraulic pump 58. When oil is supplied to the rear chamber 52 through the selection operation of the selector valve 56, the oil in the front chamber 51 is expelled out to the first tank 54, and thereby, the rod 47 extends via the piston 46. When the extended rod 47 abuts and presses the upper faces 9b of the respective movable-die support members 9, the movable platen 3 is secured to the bases 8. More specifically, with the operation of hydraulic cylinder 45, the pair of left and right movable-die support members 9 are secured to the pair of left and right bases 8 in the vertical direction.

With a pressure higher or equal to a preset pressure being applied from the outside to the piston 46 through the end portion 47a of the rod 47, the piston 46 inwardly moves, thereby to cause the oil in the rear chamber 52 to be discharged to the second tank 57.

The second absorbing mechanism 42 is provided to a front portion of the base 8. The second absorbing mechanism 42 is provided so as to oppose the third wedge 17. The second absorbing mechanism 42 functions as the second securing mechanism that secures the movable platen 3 to the base 8. The second absorbing mechanism 42 has, for example, a hydraulic cylinder.

More specifically, the second absorbing mechanism 42 has a hydraulic cylinder 61 and a piston 62. The hydraulic cylinder 61 is mounted to a mounting portion 8b of the base 8. Thus, the hydraulic cylinder 61 is secured to the base 8. On an outer surface of the mounting portion 8b, the hydraulic cylinder 61 is disposed in a position opposing the front face 9c of the movable-die support member 9. The piston 62 is enclosed in the hydraulic cylinder 61, and is extendable and retractable therein. A proximal end portion of a rod 63 is mounted to the piston 62. A distal end portion 63a of the rod 63 extends through the hydraulic cylinder 61, and abuts the front face 9c of the movable-die support member 9.

An interior portion of the hydraulic cylinder 61 is formed with the piston 62 into a front chamber (cylinder chamber on the side of the rod) 51 and a rear chamber (cylinder chamber on the side of a head) 52. The configuration and functionality are the same as those of the first absorbing mechanism 41, so that the same reference characters are used and shown, and descriptions thereof are omitted herefrom.

When the oil is supplied to the rear chamber 52 of hydraulic cylinder 61 through the selection operation of the selector valve 56 of the second absorbing mechanism 42, the oil in the front chamber 51 is expelled out to the first tank 54, and the rod 63 extends via the piston 62. The extended rod 63 abuts and presses the front face 9c of the movable-die support member 9, whereby the movable platen 3 is secured to the respective bases 8. That is, with the operation of hydraulic cylinder 45, the pair of left and right movable-die support members 9 are secured to the pair of left and right bases 8 in the direction parallel with the movement direction of the bases 8.

With a pressure higher or equal to a preset pressure being applied from the outside to the piston 62 through the distal end portion 63a of the rod 63, the piston 62 inwardly moves, thereby to cause the oil in the rear chamber 52 to be discharged to the second tank 57.

Operation of the movable-die support device 200c will now be described herebelow.

When a high-pressure die-clamping force is generated by using the hydraulic die-clamping cylinder 2a, the outer peripheral edge of the movable platen 3 undergoes a deformation to the side of the stationary platen 2, and undergoes a substantially arcuate deformation either in a side view or plan view. The first and second absorbing mechanisms 41 and 42 are provided between the base 8 and the movable-die support member 9 to absorb such a deformation when the movable platen 3 has undergone the deformation.

When the movable platen 3 is tilted along the front-rear direction A and thereby undergoes a deformation, a force resulting from the deformation is transmitted to the piston 46 through the rod 47. When the pressure higher or equal to the preset pressure is applied to the piston 46, the piston 46 inwardly moves, and the oil in the rear chamber 52 of the hydraulic cylinder 45 is expelled out to the second tank 57. That is, with extraction of the piston 46 extendably and retractably provided, the deformation of the movable platen 3 is absorbed.

Similarly, when the movable platen 3 is tilted along the left-right direction B and thereby undergoes a deformation, a force resulting from the deformation is transmitted to the piston 62 through the rod 63. When the pressure higher or equal to the preset pressure is applied to the piston 62, the piston 62 inwardly moves. Thereby, the oil in the rear chamber 52 of the hydraulic cylinder 61 is expelled out to the second tank 57. That is, with extraction of the piston 62 extendably and retractably provided, the deformation of the movable platen 3 is absorbed.

Thus, while the movable-die support member 9 is tilted along the vertical and/or left-right direction in synchronization with the movement of the movable platen 3, since the movable-die support member 9 is an independent device with respect to the base 8, the load is not imposed on the base 8. More specifically, even when the movable-die support member 9 is tilted along the vertical and/or left-right direction, the load is not imposed on the movably supported base 8. Consequently, the respective bases 8 are enabled to smoothly slide with respect to the linear guides 7. In the case outer peripheral edge of he movable platen 3 is deformed, the first and second absorbing mechanisms 41 and 42 can absorb the deformation in the same way.

Accordingly, the influence of the deformation of the movable platen 3 can be reduced, and hence the influence thereof to the stationary and movable dies 4 and 5 and the linear guides 7 can be reduced. Consequently, the linear guides 7 and the bases 8 can be protected, thereby the device service life can be increased.

(Fourth Embodiment)

Figure 14:
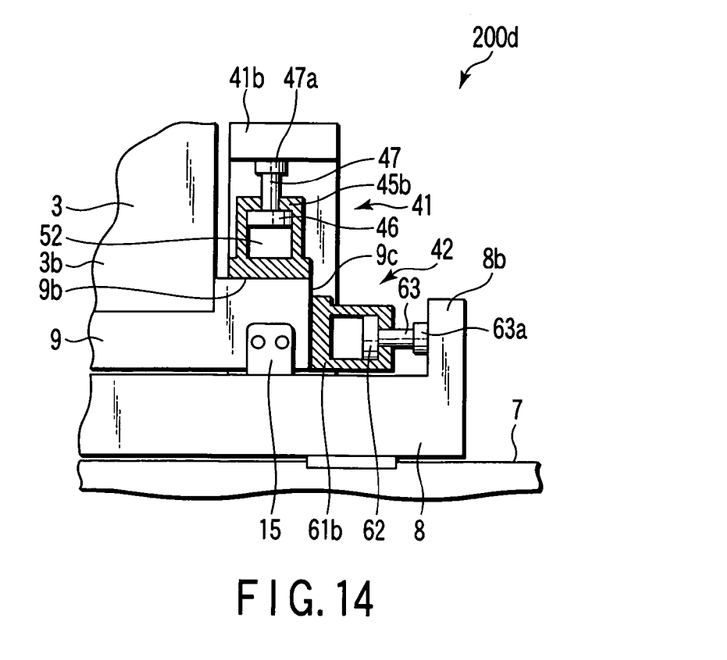
FIG. 14 is a partial cross section showing an arrangement structure of a absorbing mechanism assembled into a die-clamping unit of an injection molding machine according to a fourth embodiment of the present invention.

A fourth embodiment of the present invention will be described herebelow with reference to FIG. 14. The same reference characters are used to designate the same portions of the construction as those of either the movable-die support device 200 according to the first embodiment or the movable-die support device 200c according to the third embodiment, and descriptions thereof are omitted herefrom. In a movable-die support device 200d of the fourth embodiment, a hydraulic cylinder 45 and hydraulic cylinder 61 secured to the respective base 8 in the third embodiment are mounted to the movable-die support member 9.

More specifically, the first absorbing mechanism 41 has a hydraulic cylinder 45b and a piston 46. The hydraulic cylinder 45b is mounted to the upper face 9b of the movable-die support member 9. The hydraulic cylinder 45b is disposed in a position opposing an inner face of a mounting portion 41b. The mounting portion 41b is secured to the base 8. The piston 46 is enclosed in the hydraulic cylinder 45b, and is extendable and retractable therein. A proximal end portion of a rod 47 is mounted to the piston 46. A distal end portion 47a of the rod 47 extends through the hydraulic cylinder 45b and abuts the mounting portion 41b.

When oil is supplied to the rear chamber 52 of the hydraulic cylinder 45b through the selection operation of the selector valve 56, the oil in the front chamber 51 is expelled out to the first tank 54, whereby the rod 47 extends via the piston 46. The extended rod 47 abuts and presses the mounting portion 41b, whereby the movable platen 3 is secured to the respective bases 8. More specifically, with the operation of hydraulic cylinder 45b, the pair of left and right movable-die support members 9 are secured to the pair of left and right bases 8 in the vertical direction.

With the pressure higher or equal to the preset pressure being applied from the outside to the piston 46 through the hydraulic cylinder 45b, the piston 46 inwardly moves, thereby to cause the oil in the rear chamber 52 to be expelled out to the second tank 57.

The second absorbing mechanism 42 has a hydraulic cylinder 61b and a piston 62. The hydraulic cylinder 61b is mounted to the front face 9c of the movable-die support member 9. The hydraulic cylinder 61b is disposed in a position opposing an inner face of the mounting portion 8b. The mounting portion 8b is a part of the base 8. The piston 62 is enclosed in the hydraulic cylinder 61b, and is extendable and retractable therein. The proximal end portion of the rod 63 is mounted to the piston 62. The distal end portion 63a of the rod 63 extends through the hydraulic cylinder 61b, and abuts the mounting portion 8b.

When the oil is supplied to the rear chamber 52 of the hydraulic cylinder 61b through the selection operation of the selector valve 56 of the absorbing mechanism 42, the oil in the front chamber 51 is expelled out to the first tank 54, whereby the rod 63 extends via the piston 62. The extended rod 63 abuts and presses the mounting portion 8b, whereby the movable platen 3 is secured to the respective bases 8. That is, with the operation of hydraulic cylinder 61b, the pair of left and right movable-die support members 9 are secured to the pair of left and right bases 8 in the direction parallel with the movement direction of the respective bases 8.

With the pressure higher or equal to preset pressure being applied from the outside to the piston 62 through the hydraulic cylinder 61b, the piston 62 inwardly moves, thereby to cause the oil in the rear chamber 52 to be expelled out to the second tank 57.

Operation of the movable-die support device 200d will now be described herebelow.

When the movable platen 3 is tilted along the front-rear direction A and thereby undergoes a deformation, the hydraulic cylinder 45b is displaced in association with a displacement thereof. However, since the piston 46 is secured to the mounting portion 41b through the rod 47, the piston 46 cannot be displaced. Consequently, the displacement of the hydraulic cylinder 45b causes a pressure in the rear chamber 52 to rise. When the pressure in the rear chamber 52 becomes higher or equal to a preset pressure, the hydraulic cylinder 45b is displaced along the direction of narrowing the rear chamber 52, and the oil in the rear chamber 52 is expelled out to the second tank 57. That is, with the displacement of the piston 46 of the hydraulic cylinder 45b, the deformation of the movable platen 3 is absorbed.

Similarly, when the movable platen 3 is tilted along the left-right direction B and thereby undergoes a deformation, the hydraulic cylinder 61b is displaced in association with a displacement thereof. However, since the piston 62 is secured to the mounting portion 8b through the rod 63, the piston 62 cannot be displaced. Consequently, the displacement of the hydraulic cylinder 61b causes the pressure in the rear chamber 52 to rise. When the pressure in the rear chamber 52 becomes higher or equal to the preset pressure, the hydraulic cylinder 61b is displaced along the direction of narrowing the rear chamber 52, and the oil in the rear chamber 52 is expelled out to the second tank 57. That is, with the displacement of the piston 62 of the hydraulic cylinder 61b, the deformation of the movable platen 3 is absorbed.

Thus, even when the movable-die support member 9 is tilted along the vertical and/or left-right direction, the load is not imposed on the movably supported base 8. Consequently, the respective bases 8 are enabled to smoothly slide with respect to the linear guides 7. In the case outer peripheral edge of the movable platen 3 is deformed, the first and second absorbing mechanisms 41 and 42 can absorb the deformation in the same way.

Meanwhile, the absorbing mechanism 42 and the third wedge 17 in the third or fourth embodiment may be disposed in reversed front and rear positions.

(Fifth Embodiment)

A fifth embodiment of the present invention will be described herebelow with reference to FIGS. 17 and 18. The same reference characters are used to designate the same portions of the constructions as those of any one of the movable-die support device 200 according to the first embodiment, the movable-die support device 200c according to the third embodiment, and the movable-die support device 200d according to the fourth embodiments. Descriptions of the same portions are omitted herefrom.

In the third or fourth embodiment, there are provided the first absorbing mechanisms 41, which press the movable-die support members 9 from the upper portion onto the bases 8, and the second absorbing mechanisms 42, which press the movable-die support member 9 from the front side to rear side thereof.

Figure 17:
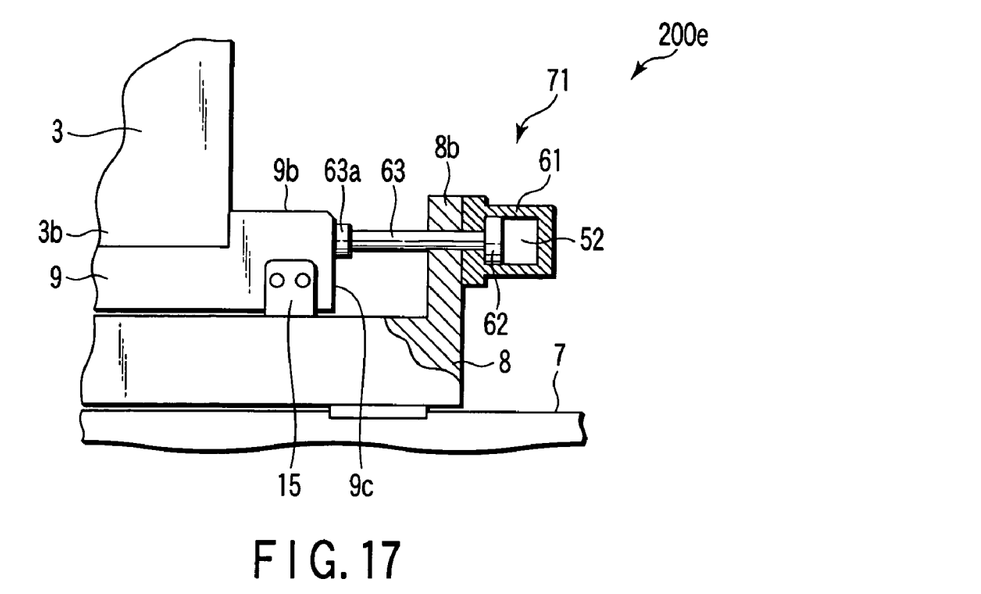
FIG. 17 is a partial cross section showing an arrangement structure of a absorbing mechanism assembled into a die-clamping unit of an injection molding machine according to a fifth embodiment of the present invention.
Figure 18:
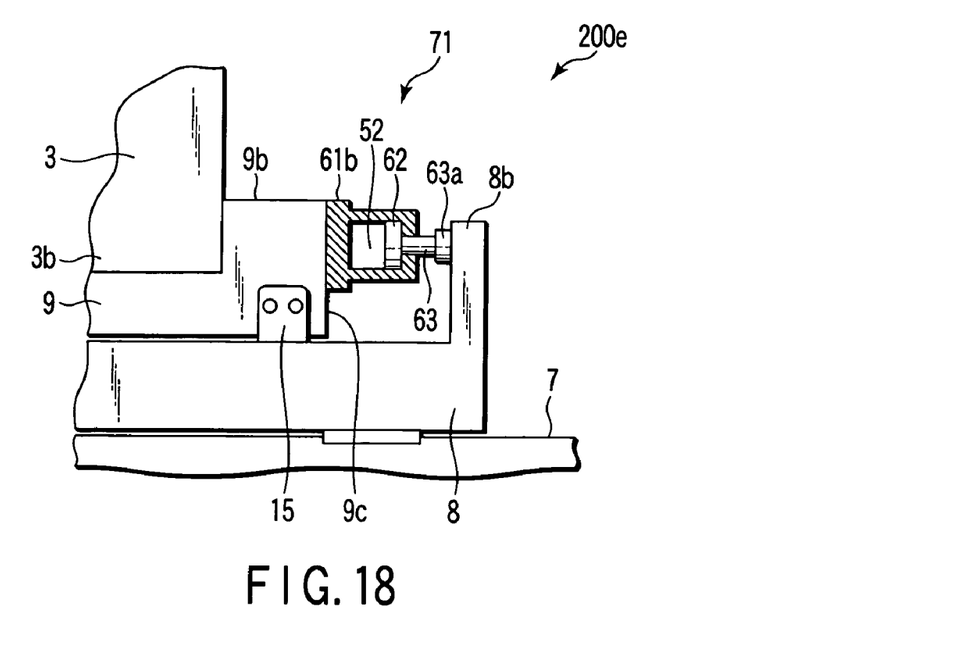
FIG. 18 is a partial cross section showing an arrangement structure of a modified example of the absorbing mechanism assembled into the die-clamping unit of the injection molding machine according to the fifth embodiment of the present invention.

However, in each movable-die support device 200e according to the present embodiment, as shown in FIGS. 17 and 18, a absorbing mechanism 71 is provided to the front face 9c (right side face in FIG. 17) of the movable-die support member 9. More specifically, the absorbing mechanism 71 is provided in a position higher than the center line of the front face 9c of the movable-die support member 9 (position spaced away from the base 8 with respect to the center line) such as to press the movable-die support member 9 in the retraction direction (left direction in FIG. 17) of the movable platen 3. Thereby, the first absorbing mechanism 41 can be omitted for the same reasons as in the second embodiment. Meanwhile, similarly as in the first embodiment, the absorbing mechanism 71 and the third wedge 17 may be disposed in the reversed front and rear positions.

In each of the third to fifth embodiments, whereas the hydraulic cylinder is employed for each of the absorbing mechanisms, any device or member may be used as long as it serves as a absorbing mechanisms. For example, a pneumatic cylinder, a pneumatic damper, a hydraulic damper or a dash pot may be employed.

Further, in each of the first to fifth embodiments, although description has been provided regarding the die-clamping device that employs the servomotors 10 as the driving mechanisms that linearly move the bases 8, there are imposed no limitations thereon as driving mechanisms capable of moving the bases 8 are used. For example, die-opening/closing hydraulic cylinders may be used. Further, description has been made with reference to the die-clamping units for the injection molding machines. However, the units may be similarly adapted to die casting machines and forming presses.

The present invention is not limited to the above-described embodiments as they are, and can be particularized by modifying the constitutional elements in practical application stages without departing from the scope of the invention. Moreover, through appropriate combinations of the plurality of constitutional elements disclosed in the above-described embodiments, various inventions can be formed. For example, some constitutional elements may be deleted from the overall constitutional elements disclosed in the embodiments. Further, constitutional elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A support device for a movable die, comprising:
   a linear guide;
   a base which is guided by the linear guide and which is linearly movable;
   a driving mechanism which linearly moves the base;
   a movable platen which is mounted on the base and which is configured to hold the movable die; and
   a securing mechanism which secures the movable platen to the base and which, when the movable platen undergoes a deformation with a pressure of die clamping, absorbs a displacement of the movable platen in a base movement direction and a displacement of the movable platen in a vertical direction due to the deformation.

2. The support device for the movable die, according to claim 1, wherein
   the securing mechanism comprises an elastic mechanism which undergoes an elastic deformation in association with a displacement of the movable platen and thereby absorbs the displacement of the movable platen.

3. The support device for the movable die, according to claim 2, wherein the elastic mechanism has any one of a disc spring and a coil spring.

4. The support device for the movable die, according to claim 1, wherein
   the securing mechanism comprises an absorbing mechanism which undergoes a displacement in association with the displacement of the movable platen and thereby absorbs the displacement of the movable platen.

5. The support device for the movable die, according to claim 4, wherein the absorbing mechanism is any one of a hydraulic cylinder and a pneumatic cylinder.

6. A support device for a movable die, comprising:
   a linear guide;
   a base which is guided by the linear guide and which is linearly movable;
   a driving mechanism which linearly moves the base;
   a movable platen which is mounted on the base and which is configured to hold the movable die; and
   a securing mechanism which includes
   a first securing mechanism which secures the movable platen to the base and which, when the movable platen undergoes a deformation with a pressure of die clamping, absorbs the displacement of the movable platen in the vertical direction; and
   a second securing mechanism which secures the movable platen to the base and which, when the movable platen undergoes a deformation with a pressure of die clamping, absorbs the displacement of the movable platen in the base movement direction.

7. The support device for the movable die, according to claim 6, wherein
   the first securing mechanism and the second securing mechanism comprise elastic mechanisms which respectively undergo an elastic deformation in association with the displacement of the movable platen and thereby absorb the displacement of the movable platen.

8. The support device for the movable die, according to claim 7, wherein the elastic mechanism has any one of a disc spring and a coil spring.

9. The support device for the movable die, according to claim 6, wherein
   the first securing mechanism and the second securing mechanism comprise absorbing mechanisms which respectively undergo a displacement in association with the displacement of the movable platen and thereby absorb the displacement of the movable platen.

10. The support device for the movable die, according to claim 9, wherein the absorbing mechanism is any one of a hydraulic cylinder and a pneumatic cylinder.

11. The support device for the movable die, according to claim 1, wherein the support device further comprises:
    a movable-die support member which is provided integrally or separately in a lower end portion of the movable platen and which is mounted between the movable platen and the base.

12. The support device for the movable die, according to claim 11, wherein
    the securing mechanism is disposed in a position higher than a center line of any one of a front face and a rear face of the movable-die support member and which absorbs the displacement of the movable platen in the vertical direction and in the base movement direction.

13. A die-clamping unit comprising:
    a stationary platen configured to hold a stationary die;
    a movable platen configured to hold a movable die, and capable of advancing toward and receding from the stationary platen;

a die-clamping mechanism which presses the movable platen against the stationary platen, and thereby die-clamps the stationary die and the movable die together;
a base having the movable platen mounted thereon;
a linear guide which linearly movably guides the base;
a driving mechanism which linearly moves the base; and
a securing mechanism which secures the movable platen to the base and which, when the movable platen undergoes a deformation with a pressure of die clamping, absorbs a displacement of the movable platen in a base movement direction and a displacement of the movable platen in a vertical direction due to the deformation.

14. The die-clamping unit, according to claim 13, wherein the securing mechanism comprises:
a first securing mechanism which secures the movable platen to the base and which absorbs the displacement of the movable platen in the vertical direction; and
a second securing mechanism which secures the movable platen to the base and which absorbs the displacement of the movable platen in the base movement direction.

* * * * *